(12) United States Patent
Tsuda et al.

(10) Patent No.: US 7,522,375 B2
(45) Date of Patent: Apr. 21, 2009

(54) MAGNETIC DISK DRIVE WITH COVER SEAL AND METHOD FOR FABRICATING SAME

(75) Inventors: Shingo Tsuda, Kanagawa (JP); Kohichi Suzuki, Kanagawa (JP); Yoshinori Mitsuhashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 396 days.

(21) Appl. No.: 11/327,177

(22) Filed: Jan. 6, 2006

(65) Prior Publication Data

US 2006/0176610 A1 Aug. 10, 2006

(30) Foreign Application Priority Data

Jan. 7, 2005 (JP) ............................. 2005-002474

(51) Int. Cl.
*G11B 33/14* (2006.01)
(52) U.S. Cl. ................................... 360/97.02
(58) Field of Classification Search .............. 360/97.02; 720/648, 655
See application file for complete search history.

(56) References Cited

U.S. PATENT DOCUMENTS

| | | | | |
|---|---|---|---|---|
| 5,097,978 A | 3/1992 | Eckerd | ........................ | 220/315 |
| 5,270,887 A | 12/1993 | Edwards et al. | .......... | 360/97.03 |
| 6,088,190 A * | 7/2000 | Anderson | ................. | 360/97.02 |
| 6,266,207 B1 | 7/2001 | Iwahara et al. | ........... | 360/97.02 |
| 6,721,128 B1 | 4/2004 | Koizumi et al. | .......... | 360/97.02 |
| 6,903,898 B2 | 6/2005 | Nonaka et al. | ........... | 360/97.01 |
| 2001/0009486 A1* | 7/2001 | Iwahara et al. | ........... | 360/97.02 |
| 2007/0104913 A1* | 5/2007 | Nonaka et al. | .............. | 428/40.1 |

FOREIGN PATENT DOCUMENTS

| | | |
|---|---|---|
| JP | 10-055662 A | 2/1998 |
| JP | 2001-216774 A | 8/2001 |

* cited by examiner

*Primary Examiner*—Julie Anne Watko
(74) *Attorney, Agent, or Firm*—Townsend and Townsend and Crew LLP; John Henkhaus

(57) ABSTRACT

Embodiments of the invention shorten a work time required for peeling off a cover seal during rework. In one embodiment, a magnetic disk drive includes: a base provided with a bonded surface around an opening edge and containing therein a head driving mechanism and a magnetic disk; a top cover to be fitted to the opening edge so as to be fixed to the base; and a cover seal including a liner disposed at an outside surface of the top cover, a sheet-like structure and an adhesive layer formed on the structure, the adhesive layer being laminated in such a manner as to face to the bonded surface and the outside surface of the top cover, at which the liner is disposed, to be thus fixed to the base.

15 Claims, 6 Drawing Sheets

(A)

|     | Adhesion width [mm] | D Liner Area [m²] | C Seal Area [m²] | D/C | LEAK [mmHg] | Peeling [sec] |
|---|---|---|---|---|---|---|
| (1) | 50 | 0 | 0.014 | 0.00 | 0.55 | 600 |
| (2) | 16 | 0.005 | 0.014 | 0.36 | 0.5 | 150 |
| (3) | 12.1 | 0.006 | 0.014 | 0.45 | 0.51 | 85 |
| (4) | 10 | 0.008 | 0.014 | 0.57 | 0.52 | 46 |
| (5) | 8.3 | 0.01 | 0.014 | 0.71 | 0.82 | 42 |
| (6) | 6.3 | 0.012 | 0.014 | 0.90 | 3 | 43 |
| (7) | 6 | 0.013 | 0.014 | 0.93 | 3.4 | 44 |

(B)

(C)

(A)

|  | Adhesion width [mm] | A [mm] | B [mm] | B/A | LEAK [mmHg] | Peeling [sec] |
|---|---|---|---|---|---|---|
| (10) | 50 | 2.9 | 46.6 | 16.07 | 0.55 | 600 |
| (11) | 16 | 2.9 | 12.6 | 4.34 | 0.5 | 150 |
| (12) | 12.1 | 2.9 | 8.7 | 3.00 | 0.51 | 85 |
| (13) | 10 | 2.9 | 6.6 | 2.28 | 0.52 | 46 |
| (14) | 8.3 | 2.9 | 4.9 | 1.69 | 0.82 | 42 |
| (15) | 6.3 | 2.9 | 2.9 | 1.00 | 3 | 43 |
| (16) | 6 | 2.9 | 2.6 | 0.90 | 3.4 | 44 |

(B)

(C)

MAGNETIC DISK DRIVE WITH COVER SEAL AND METHOD FOR FABRICATING SAME

CROSS-REFERENCES TO RELATED APPLICATIONS

This application claims priority from Japanese Patent Application No. JP2005-002474, filed Jan. 7, 2005, the entire disclosure of which is incorporated herein by reference.

BACKGROUND OF THE INVENTION

The present invention relates to a magnetic disk drive and a method for fabricating the same, in which a cover seal for covering a seam between an opening edge of a base and a cover for closing the opening edge of the base is improved.

A magnetic disk drive is principally constituted of a head disk assembly (hereinafter abbreviated as "an HDA" in the specification). The HDA is configured such that a magnetic disk, an actuator head suspension assembly, a spindle motor and electronic parts are tightly enclosed in a clean ambient environment by the use of a base for containing therein the magnetic disk, the actuator head suspension assembly, the spindle motor and the electronic parts, a cover for covering an opening of the base, and a cover seal for covering a seam between an opening edge of the base and the cover. Therefore, the magnetic disk drive is assembled in a clean room. As the actuator head suspension assembly in the magnetic disk drive is connected to an actuator for supporting a head for reading and writing data from and in a rotating magnetic disk and locating the head at a predetermined position. A mechanism for driving the actuator is a voice coil motor (hereinafter abbreviated as "a VCM" in the specification) including a coil, a magnet and a yoke.

There have been various kinds of conventionally proposed cover seals for use in holding air-tightness in the above-described magnetic disk drive.

For example, Patent Document 1 (Japanese Patent Laid-open No. 10-55662 (pages 2 and 3 and FIGS. 1 and 2)) discloses the technique in which a cover member such as a pressing lid is disposed in a box-shaped base member containing a magnetic disk mechanism therein, and the inside of a magnetic disk drive is tightly enclosed by covering a clearance defined at a joint between the base member and the cover member with a seal member (i.e., a cover seal) from above. The seal member is constituted by laminating an aluminum layer on an adhesive layer or laminating an aluminum layer, an adhesive layer and a polyethylene terephthalate layer in this order on an adhesive layer.

Patent Document 2 (Japanese Patent Laid-open No. 11-232833 (pages 3 and 4 and FIGS. 2 to 5), for example, discloses the technique in which a housing opening formed at a housing body (i.e., a base) containing therein a magnetic disk, a magnetic head and the like is covered with a flat cover, before a seam between a housing opening edge and a cover is adhesively sealed with a cover seal at the upper surface of the cover in an air-tight manner. The cover seal is constituted by laminating a metallic foil layer on an adhesive layer or laminating a polyethylene terephthalate layer, an adhesive layer and another polyethylene terephthalate layer in this order on another adhesive layer.

Patent Document 3 (Japanese Patent Laid-open No. 2002-322444 (pages 2 and 3 and FIG. 1), for example, discloses the technique in which an adhesive label for an HDD (i.e., a cover seal) is bonded to an outer surface of a top cover of a hard disk drive constituted of a box-shaped housing body (i.e., a base) containing therein a recording disk, a magnetic head, a spindle motor and the like, and a top cover corresponding to the housing body, thereby holding air-tightness of the hard disk drive. In the adhesive label for an HDD, an adhesive agent layer is formed at either surface of a laminate base member consisting of at least three layers, that is, a metallic foil layer and resin film layers laminated at both surfaces of the metallic foil layer.

Alternatively, Patent Document 4 (Japanese Patent Laid-open No. 2001-216774 (pages 2 to 4 and FIGS. 2 to 4), for example, discloses the technique of holding air-tightness of a housing, in which a seat member made of rubber or a synthetic resin is disposed at a joint between a case body (i.e., a base) containing therein a disk, a magnetic head, a spindle motor and the like and a lid for covering an opening formed at the case body. The seat member is formed by laminating a seat body, an adhesive agent and a cover film in this order. The seat body is bonded to the lid. The cover film is peeled off in such a manner as to expose the adhesive agent at a portion facing to an end surface on a side wall of the case body, thereby holding the air-tightness of the housing.

BRIEF SUMMARY OF THE INVENTION

In the magnetic disk drives disclosed in Patent Documents 1, 2, and 3, which have been described under the section of "Background of the Invention", the cover seal is bonded by fitting the cover to the opening formed at the base in such a manner as to cover the seam between the opening edge of the base and the cover from above, before an operation test or an air-tightness test is performed. In the case where the magnetic disk drive is certified as a deficient product in the operation test, rework is required: the cover seal is peeled off; a component part concerned is replaced with a new one; and the cover seal is bonded again, thereby obtaining a complete product. In the meantime, in the air-tightness test, a decrease in pressure is measured after the magnetic disk drive is left for a given period of time under a predetermined pressure through, for example, a ventilation filter disposed at the cover. At this time, if the measurement result does not satisfy a reference value, rework is required: namely, the cover seal is peeled off, and then, the cover seal is bonded again.

However, in the magnetic disk drives disclosed in Patent Documents 1, 2, and 3, since the adhesive layer of the cover seal adheres over the entire cover in order to hold the air-tightness of the HDA, it has become difficult to peel off the cover seal during the rework. Further, a long work time has been required for peeling off the cover seal even if the cover seal may be peeled off, thereby raising a drawback of degradation of reworkability.

Furthermore, the magnetic disk drive disclosed in Patent Document 4 is configured such that the seal member is disposed at the joint between the inner surface of the lid and the case body. Numerous holes have been formed at the lid for the purpose of the incorporation of various component parts, and therefore, numerous holes must be formed also at the seal member in such a manner as to correspond to the holes formed at the lid.

Moreover, there may be a cover which is embedded except for an adhesive surface required for tightly enclosing the inside of the base. When the cover seal is bonded over the entire surface of such a cover, the cover seal has been liable to be bent at the embedded portion, thereby making it difficult to bond the cover seal without any crease. Therefore, there has raised a drawback of degradation of reworkability during the rework. In addition, it has not been clear as to what size to which a bonded surface required for the enclosure is set.

In view of the above-described problems, an object of the present invention is to provide a magnetic disk drive and a method for fabricating the same, in which a working time required for peeling off a cover seal may be shortened during rework. Furthermore, another object of the present invention is to provide a magnetic disk drive and a method for fabricating the same, in which both of a function of enhancing reworkability of a cover seal and a function of holding air-tightness of an HDA may be exhibited at the same time.

The present invention is directed to enhancing the reworkability of a tightly sealing cover seal to be bonded to a cover and a base in an HDA. A magnetic disk drive having the above-described structure has been widely adopted in recent years since the magnetic disk drive may be fabricated at a lower cost in comparison with a gasket for tightly sealing the inside of the base by interposing the gasket between the base and the cover and the number of screws for fixing the cover to the base may be reduced. However, with the above-described structure, the air-tightness must be held by covering the entire cover with the cover seal, and moreover, weatherability or reliability is required for the adhesiveness of the cover seal in order to ensure the air-tightness of the HDA. Therefore, it is very difficult to peel off the cover seal, thereby degrading the reworkability. In view of these, according to the present invention, both of the function of enhancing the reworkability of the cover seal and the function of holding the air-tightness of the HDA may be exhibited at the same time by reducing an adhesion region without degrading the air-tightness of the HDA when the entire cover is covered with the cover seal.

Thus, according to a first aspect of the present invention, there is provided a magnetic disk drive comprising: a base provided with a bonded surface around an opening edge and containing therein a head driving mechanism and a magnetic disk; a top cover to be fitted to the opening edge so as to be fixed to the base; a cover seal including a sheet-like structure and an adhesive layer formed on the structure and disposed at the surface of the top cover to be fitted to the opening edge and the bonded surface of the base, so as to be fixed to the base owing to the adhesion of the adhesive layer to the surface and the bonded surface; and a liner interposed between the adhesive layer of the cover seal and the surface of the top cover.

According to the first aspect of the present invention, in the case where the top cover is fitted to the opening edge of the base and the cover seal is bonded to the top cover and the bonded surface of the base in such a manner that the adhesive layer of the cover seal faces to the bonded surface of the base and an outside surface of the top cover, the cover seal may be readily peeled off during rework since the liner is disposed at the outside surface of the top cover.

Moreover, according to a second aspect of the present invention, there is provided a method for fabricating a magnetic disk drive comprising the steps of: providing a base including a bonded surface around an opening edge and containing therein a head driving mechanism and a magnetic disk; bonding a peeling film to a sheet-like structure, to which an adhesive agent is applied, so as to provide a cover seal, in which the peeling film is cut in conformity with the contour of a liner; fitting a top cover to the opening edge of the base, so as to fix the top cover to the base; removing the peeling film from the cover seal except for a portion of the liner, so as to expose an adhesive layer made of the adhesive agent; and adhesively bonding the exposed adhesive layer to the bonded surface in the state in which the liner faces to the surface of the top cover fitted to the opening edge, so as to fix the cover seal to the base.

According to the present invention, since the adhesive layer of the cover seal adheres only to the outside surface of the top cover except for the portion of the liner, the cover seal may be readily peeled off during the rework. In addition, a time required for peeling off the cover seal may be shortened, thus enhancing reworkability more than in the prior art. Additionally, according to the present invention, both of the function of enhancing the reworkability of the cover seal and the function of holding the air-tightness of the HDA may be exhibited at the same time.

DETAILED DESCRIPTION OF THE INVENTION

Figure 1:
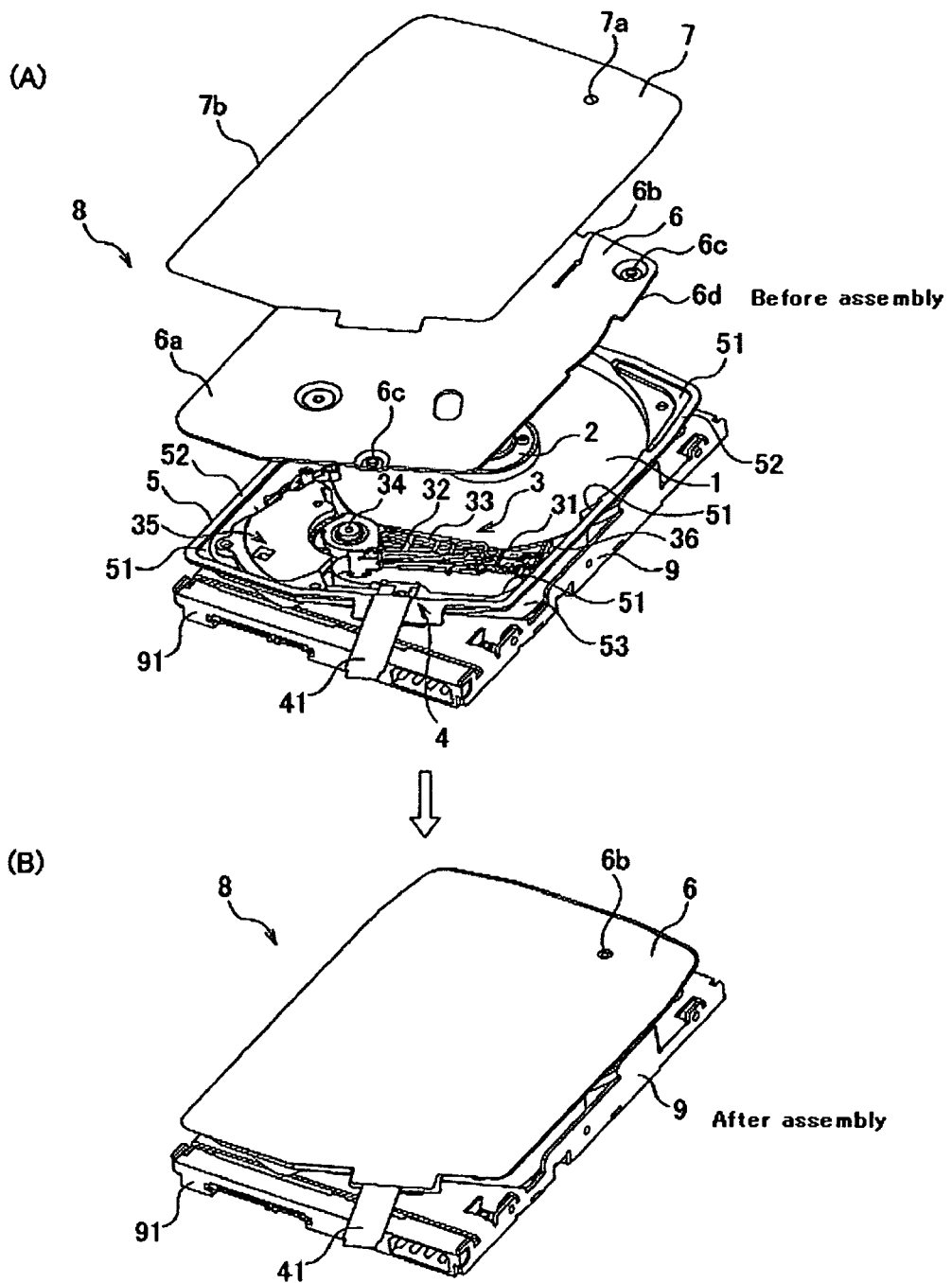
FIGS. 1(A) and 1(B) are perspective views showing a magnetic disk drive in an embodiment according to the present invention.
Figure 2:
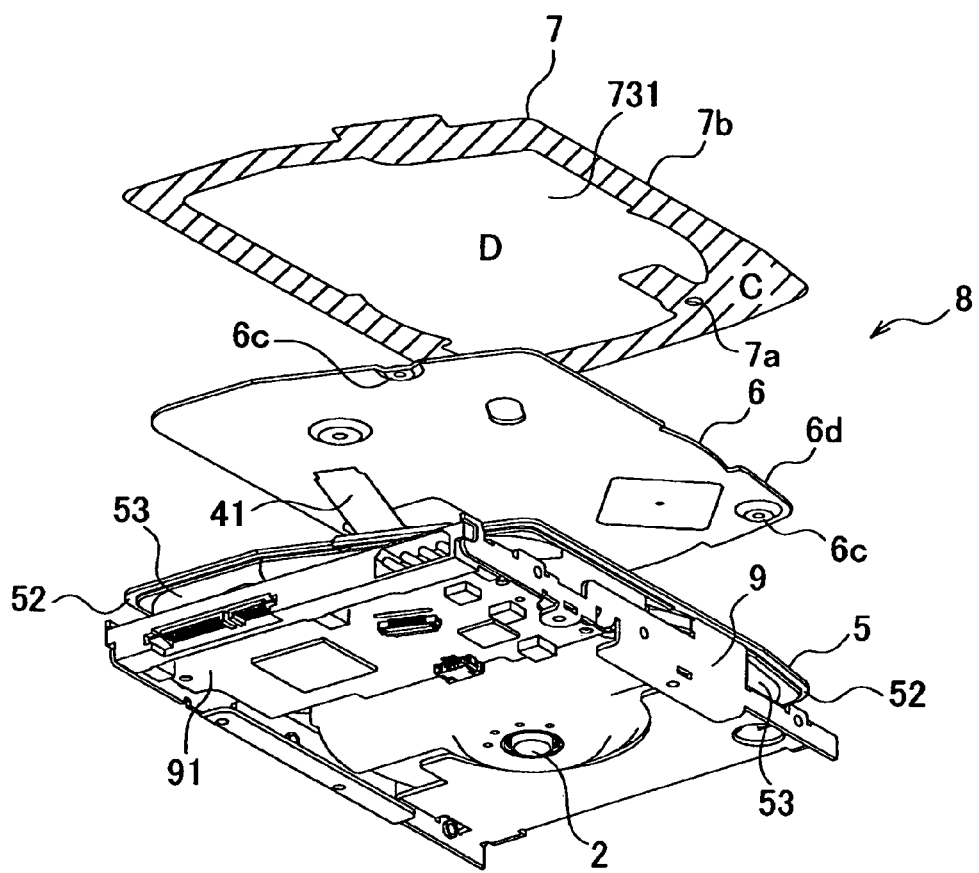
FIG. 2 is a perspective view showing the magnetic disk drive in the embodiment according to the present invention.
Figure 3:
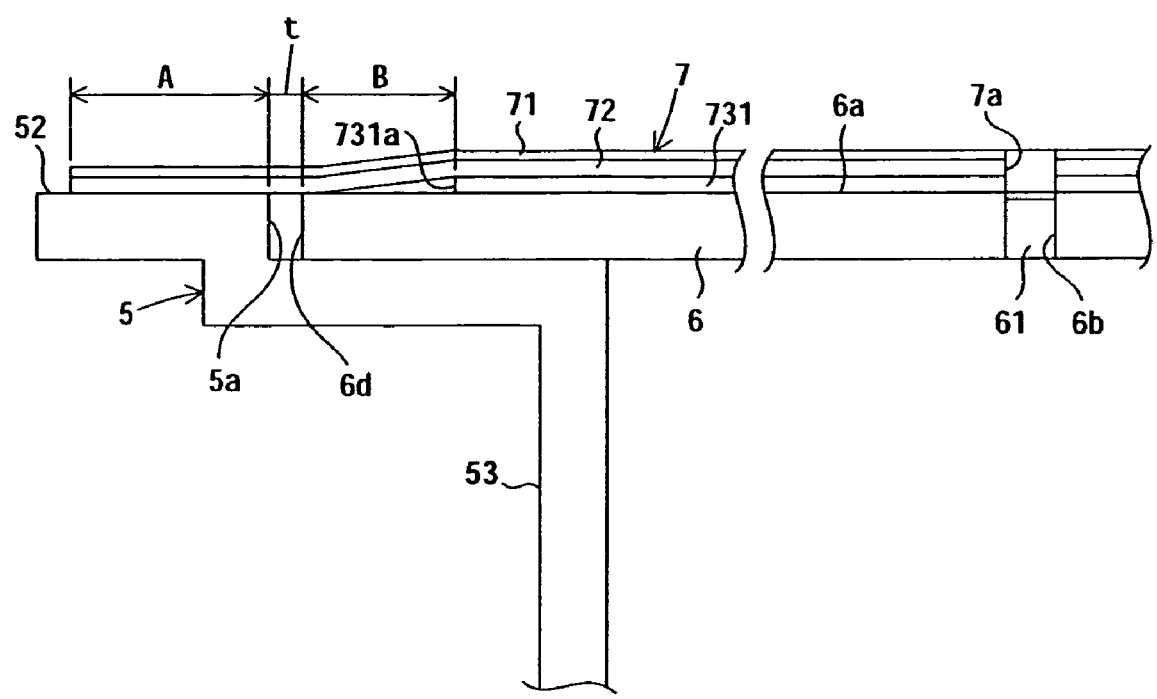
FIG. 3 is a cross-sectional view showing the magnetic disk drive in the embodiment according to the present invention.

Hereinafter, a description will be given of a magnetic disk drive and a method for fabricating the same in an exemplary embodiment according to the present invention in reference to the attached drawings. FIGS. 1(A) and 1(B) are views showing the configuration of a magnetic disk drive. FIG. 1(A) is an exploded perspective view showing a base, a top cover and a cover seal and FIG. 1(B) is an assembly perspective view of FIG. 1 (A). FIG. 2 is an exploded perspective view showing the base, the top cover and the cover seal, as the configuration of the magnetic disk drive is viewed from the back. FIG. 3 is a cross-sectional view showing the arrangement relationship among the base, the top cover and the cover seal. FIGS. 4(A) to 4(D) are cross-sectional views showing a laminate structure of the cover seal. In all of the attached drawings according to the present application, the same constituent elements are designated by the same reference numerals.

As shown in FIGS. 1(A), 1(B) and 2, the magnetic disk drive in the embodiment according to the present invention comprises: an HDA 8 including a magnetic disk 1, a spindle motor 2, an actuator head suspension assembly (hereinafter abbreviated as "an AHSA" in the specification) 3 and an FPC assembly 4, which are contained in a base 5; a top cover 6 for tightly sealing a space inside of the base 5 containing the above-described component parts therein; and a cover seal 7 to be bonded on the top cover 6 from above. Furthermore, onto the base 5 in the HDA 8 is fixed a frame 9 having a circuit board 91 for actuating the magnetic disk drive and controlling to read and write data.

The magnetic disk 1 is fixed on the outer periphery of a spindle, not shown, to be driven by the spindle motor 2 erected on the base 5. The AHSA 3 is constituted of a head gimbal assembly (hereinafter abbreviated as "an HGA" in the specification) 31 and a carriage 32. At the tip of the HGA 31 is disposed a head, not shown, for reading and/or writing data from and/or on the magnetic disk 1. The carriage 32 includes an actuator arm 33 for supporting the HGA 31, a bearing portion of a pivot 34 and a coil support 35. The coil support 35 is arranged within a magnetic field generated by a voice coil magnet and a voice coil yoke. The voice coil magnet, the voice coil yoke and a voice coil constitute a voice coil motor, not shown, for generating driving force for turning the carriage.

Moreover, in the vicinity of the magnetic disk 1 is disposed a ramp 36 for exhibiting the function of providing a slide surface for a merge lip, not shown, disposed at the tip of the HGA 31 so as to allow the head to retreat when the rotation of the magnetic disk 1 is stopped.

The FPC assembly 4 is adapted to transmit a signal output from the head of the HGA 31 and a drive current to the voice coil motor in the coil support 35. In the FPC assembly 4, a signal line from the head of the HGA 31 and a control line from the voice coil motor are electrically connected to the circuit board 91 via a flexible cable 41 (a connected portion is not shown). The flexible cable 41 is a component part which is repeatedly bent by the turn of the AHSA 3 on the pivot 34 as a rotary shaft, and therefore, the reliability is required with respect to wire breakage.

In the base 5, steps 51 for use in fitting the top cover 6 are formed inside around an opening edge 53, and further, bonded surfaces 52 for use in bonding the cover seal 7 are formed outside around the opening edge 53. As shown in FIG. 3, the base 5 is made by pressing a metallic plate such as a steel plate by cold rolling (i.e., SPCE) after, for example, plating, and further, the bonded surface 52 is obtained by bending the opening edge 53. The bonded surface 52 is formed in the above-described manner, so that the cover seal 7 is readily bonded to the bonded surface 52. The base 5 and the top cover 6 are configured such that a surface 6a of the top cover 6 fitted to the steps 51 at the opening edge 53 in the base 5 is flush with the bonded surfaces 52 of the base 5. The cover seal 7 is readily bonded to each of the surfaces when the bonded surfaces 52 of the base 5 are flush with the surface 6a of the top cover 6, thereby readily holding the air-tightness. Incidentally, the bonded surfaces 52 of the base 5 need not be completely flush with the surface 6a of the top cover 6. The flushness may be satisfied within an allowable dimensional tolerance for the fitting portion. Otherwise, the base 5 may be made of other metallic materials such as an aluminum die-casting.

As shown in FIGS. 1(A), 1(B) and 3, a ventilation hole 6b is formed at the top cover 6, and further, a ventilation filter 61 for preventing any intrusion of dust from the outside is disposed at the ventilation hole 6b. At the top cover 6 are formed several screw holes 6c for screwing the top cover 6 in the base 5 after the fitting. Moreover, the top cover 6 is made of a metallic material such as a stainless steel plate.

Figure 4:
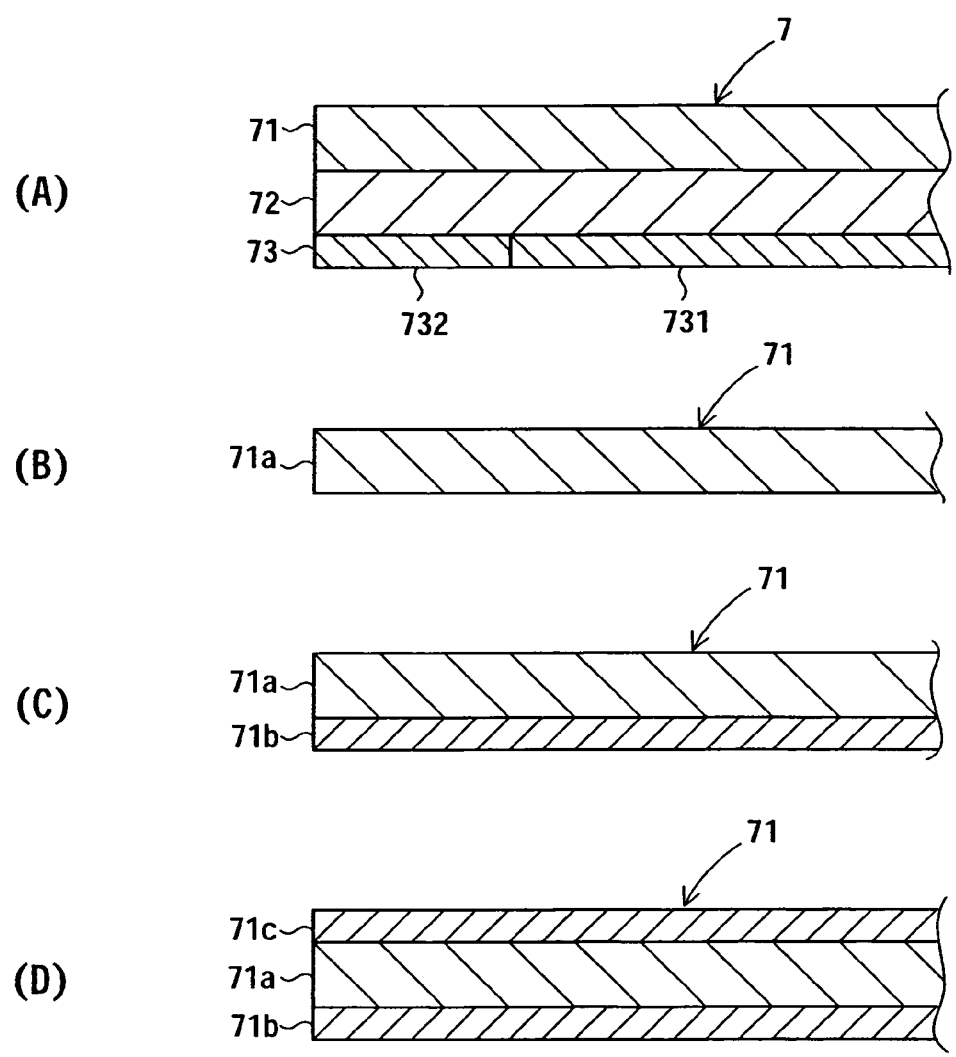
FIGS. 4(A) to 4(D) are cross-sectional views showing a laminate structure of a cover seal.

As shown in FIG. 4(A), the cover seal 7 includes a sheet-like structure 71, an adhesive layer 72 formed on the structure 71 and a peeling film 73 laminated on the adhesive layer 72 and having a liner 731. When the adhesive layer 72 is a viscously elastic member in the case where it is applied over the sheet-like structure 71 as long as an adhesive agent is a pressure sensitive adhesive agent, the adhesive layer 72 may keep a predetermined hardness to such an extent that it cannot semipermanently be solidified but may be peeled off at all times. Consequently, the cover seal 7 may be bonded to the top cover 6 under pressure; in contrast, the cover seal 7 may be peeled off from the top cover 6. As the above-described adhesive agent is used any of adhesive agents such as natural rubber-based adhesive agents, synthetic rubber-based adhesive agents, acrylic adhesive agents, solvent-based acrylic adhesive agents, acrylic emulsion-based adhesive agents, acrylic hot-melt adhesive agents and silicone-based adhesive agents, which have been publicly known and commonly used. Here, when the cover seal 7 is adhesively bonded to the top cover 6 under pressure, a ventilation hole 7a is formed also at the cover seal 7 in such a manner that the ventilation filter 61 disposed in the top cover 6 may ventilate.

From the viewpoint of rigidity as a base member, the sheet-like structure 71 may be made of an aluminum layer 71a, as shown in FIG. 4(B). Otherwise, the sheet-like structure 71 may be made of the aluminum layer 71a and a polyethylene terephthalate layer 71b, as shown in FIG. 4(C), and further, the adhesive layer 72 may be formed on the polyethylene terephthalate layer 71b. In the structure 71, the cover seal 7 may be more readily peeled off from the top cover 6 when the adhesive agent is applied to polyethylene terephthalate than when the adhesive agent is applied directly to aluminum in the case where the cover seal 7 is adhesively bonded to the entire top cover 6. This is because the adhesive agent is more firmly bonded to polyethylene terephthalate than to aluminum. Therefore, the structure 71 may be any type as long as the adhesive agent is applied to polyethylene terephthalate. As shown in FIG. 4(D), the structure 71 may be formed by laminating the first polyethylene terephthalate layer 71b, the aluminum layer 71a and a second polyethylene terephthalate layer 71c in this order, and further, the adhesive layer 72 may be formed on the first polyethylene terephthalate layer 71b.

The liner 731 is placed at the surface 6a of the top cover 6, wherein it may use a part of the peeling film 73 bonded onto the adhesive layer 72. If the liner 731 consists of a part of the peeling film 73, the sheet-like structure 71 need not be covered with the adhesive layer 72. As a consequence, it is possible to fabricate the cover seal 7 excellent in reworkability without using any additional materials. The feature of the peeling film used also as the liner 731 resides in that the peeling film is formed into a thin sheet for masking the adhesive layer. In view of this, the material of the peeling film should be preferably polyethylene terephthalate or a synthetic resin film with little gas emission.

The total thickness of the structure 71 and the adhesive layer 72 in the cover seal 7 such configured as described above should desirably range from about 7 μm or more to about 75 μm or less. If the total thickness of the structure 71 and the adhesive layer 72 is set to about 7 μm or more, the rigidity as the base member may be maintained: in contrast, if it is set to about 75 μm or less, the cover seal 7 becomes conformable to the bonded surface of the magnetic disk drive of a small size.

The HDA is widely applicable to magnetic disk drives of various types by setting the width of the bonded surface 52 of the base 5, to which the cover seal 7 in the above-described structure 71 is bonded, from about 0.5 mm or more to about 3.0 mm or less. The width of the bonded surface 52 of the base 5 is any of numeric values resulting from a test carried out by the present inventors. If the width of the bonded surface 52 of the base 5 is less than about 0.5 mm, there arises a problem of bonding accuracy degraded by deviation or the like of the cover seal 7, thereby making it difficult to securely bond the cover seal 7 to the bonded surface 52, for example. In the meantime, the width of the bonded surface 52 of the base 5 is defined to about 3.0 mm or less because the width of the bonded surface 52 of the base 5 is limited to about 3.0 mm in consideration of a clearance between the magnetic disk 1 and the base 5 or the thickness of the base 5, although a value allocated to the width of the bonded surface 52 of the base 5 becomes 3.3 mm since the standard of the diameter of the magnetic disk 1 is 95 mm and the standard of the width of the base 5 is 101.6 mm in the case of a 3.5 type magnetic disk (i.e., a 3.5-inch (which is equal to about 8.89 cm) type).

It is preferable that the adhesive layer 72 of the cover seal 7 should be adhesively bonded to the bonded surface 52 of the base 5 in the entire width in order to satisfy the air-tightness holding function of the HDA. However, in view of the problem of the bonding accuracy degraded by the deviation or the like of the cover seal 7, a bonding dimensional tolerance for defining the adhesion length of the adhesive layer 72 of the cover seal 7 with respect to the bonded surface 52 is determined. The bonding dimensional tolerance of the cover seal 7 with respect to the bonded surface 52 of the base 5 should desirably range within ±30%. In this manner, the adhesive layer 72 of the cover seal 7 may be bonded over the length of about 70% or more of the width of the bonded surface 52 of the base 5 by ranging the bonding dimensional tolerance within ±30%. The bonding dimensional tolerance of the cover seal 7 with respect to the bonded surface 52 of the base 5 is any of numeric values resulting from a test carried out by the present inventors, and thus, it defines the adhesion length required for holding the air-tightness. In the case of, for example, the 3.5 type magnetic disk drive having the bonded surface 52 of the base 5, to which the cover seal 7 is bonded, in a width of 3.0 mm, an adhesion length of 2.1 mm may be secured, thereby achieving the adhesion without any peeling-off of the cover seal 7, so as to hold the air-tightness.

When the cover seal 7 is bonded to the bonded surface 52 of the above-described base 5, a lower limit value of the thickness of the liner 731 may be a lower limit value from the viewpoint of a fabricating capacity: in contrast, an upper limit value may be about 25 μm. The upper limit value is set to about 25 μm because the adhesive layer 72 of the cover seal 7 facing to the surface 6a of the top cover 6, at which the liner 731 is disposed, narrows an adhesion region of the adhesive layer 72 of the cover seal 7 during the actual adhesion to a member to be bonded from an end 731a of the liner 731 if the liner 731 becomes thicker than about 25 μm, and therefore, an error occurs in the air-tightness test result of the HDA.

The present inventors have found that there is a possibility of occurrence of an error in the air-tightness test in a fabricating process if a leakage quantity exceeds 3 mmHg in the magnetic disk drive, and that there is a possibility of a low yield in the fabricating process if a required peeling time exceeds 90 sec. As a consequence, the present inventors desirably have intended that the leakage quantity should be about 3 mmHg or less in the magnetic disk drive and the time required for peeling off the cover seal 7 should be about 90 sec. or shorter.

In order to satisfy the above-described leakage quantity and required peeling time, the relative ratio D/C of the total area C of the cover seal 7 (see FIG. 2) to the total area D of the liner 731 (see FIG. 2) was variously examined.

A 3.5 type magnetic disk drive was used in tests. The cover seal 7 was formed by laminating the liner 731 made of polyethylene terephthalate on the sheet-like structure 71 including the aluminum layer 71a and the polyethylene terephthalate layer 71b, as shown in FIG. 4(C), and the adhesive layer 72 formed on the polyethylene terephthalate layer 71b. In the cover seal 7, the thickness of the aluminum layer 71a was 50 μm; the thickness of the polyethylene terephthalate layer 71b was 12.5 μm; the thickness of the adhesive layer 72 was 100 μm; and the thickness of the liner 731 was 12.5 μm.

The leakage quantity was examined in the air-tightness test for measuring a leakage quantity of an inner pressure. In the meantime, the cover seal 7 was peeled off from the bonded surface 52 of the base 5 and the surface 6a of the top cover 6 in the required peeling time test.

For example, as shown in FIG. 3, a predetermined pressure was applied through the ventilation filter 61 disposed in the top cover 6 and a decrease in pressure was measured after the magnetic disk drive was left for a given period of time in the air-tightness test. At this time, if the decrease in pressure exceeded a reference value, the cover seal 7 needed to be peeled off, followed by rework for bonding the cover seal 7 again. Here, since the adhesive layer 72 of the cover seal 7 was adhesively bonded only onto the surface 6a of the top cover 6 except for the liner 731, the cover seal 7 could be readily peeled off during the rework. Consequently, it was possible to shorten the peeling time so as to enhance reworkability in comparison with that in the prior art. In the meantime, a time required for manually peeling off the bonded cover seal 7 by the use of a tool such as tweezers was measured in the peeling test. Since the cover seal 7 might be cut during the peeling work, the time signified a time required for removing all of the cover seal 7 including such a cut piece. In fact, although the surface had to be flattened by removing the adhesive agent remaining thereafter, the flattening time was constant. Therefore, it was not included in the present test since it was not suitable for comparison. In the air-tightness test, the inside of the HDA was pressurized up to 30 mmHg through the ventilation filter 61 and was left for 5 sec., and thereafter, a Δ value of the decrease in pressure was measured.

Figure 5:
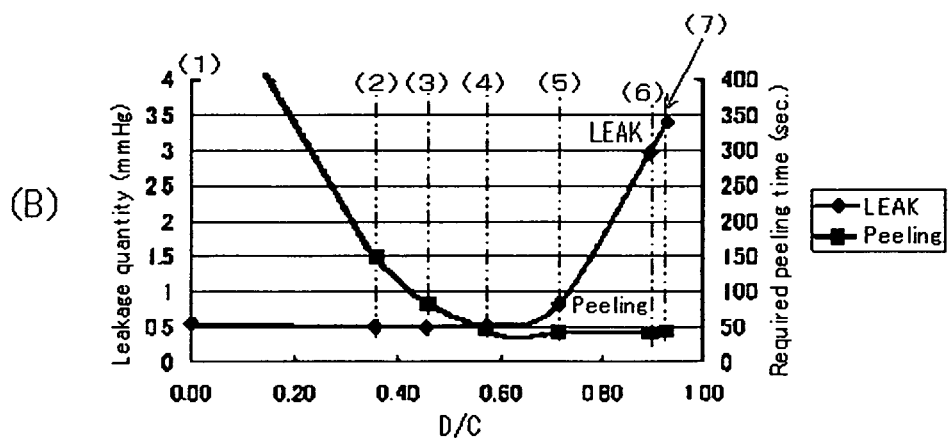
FIGS. 5(A) to 5(C) are a table and graphs illustrating test results according to the present invention.
Figure 5:
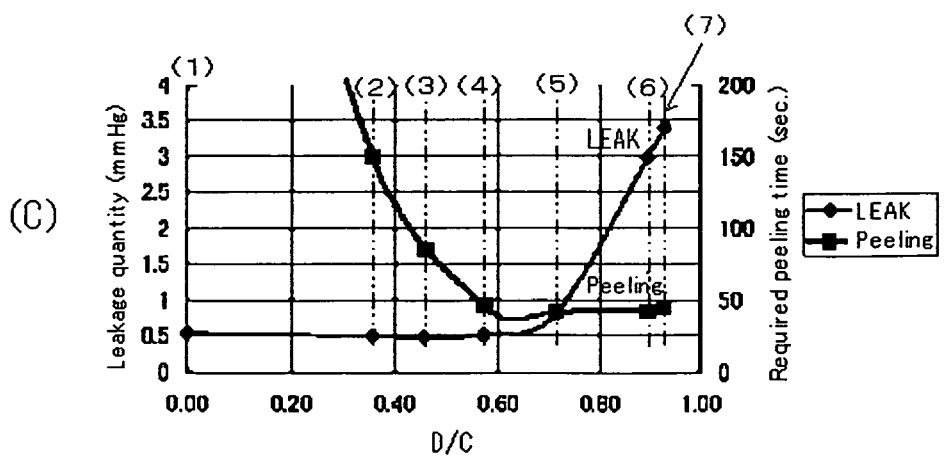

FIGS. 5(A) to 5(C) illustrate the results of the air-tightness test and the peeling-off test. FIGS. 5(A) to 5(C) are a table and graphs illustrating the test results, in which the relative ratio D/C of the total area C of the cover seal 7 (see FIG. 2) to the total area D of the liner 731 (see FIG. 2) was calculated in reference to the total area C, and then, the relative ratio D/C was examined a plurality of times with respect to seven sample patterns. Here, FIG. 5(A) is a table illustrating the test results; FIG. 5(B) is a graph illustrating the relationship between the relative ratio D/C and the leakage quantity and the relationship between the relative ratio D/C and the required peeling time; and FIG. 5(C) is a graph in which the required peeling time in FIG. 5(B) is varied.

In a sample (1), an adhesion width was 50 mm; C was 0.014 $m^2$; D was 0 $m^2$; and D/C was 0.00. The sample (1) exhibited a leakage quantity of 0.55 mmHg and a required peeling time of 600 sec.

In a sample (2), an adhesion width was 16 mm; C was 0.014 $m^2$; D was 0.005 $m^2$ and D/C was 0.36. The sample (2) exhibited a leakage quantity of 0.5 mmHg and a required peeling time of 150 sec.

In a sample (3), an adhesion width was 12.1 mm; C was 0.014 $m^2$; D was 0.006 $m^2$; and D/C was 0.45. The sample (3) exhibited a leakage quantity of 0.51 mmHg and a required peeling time of 85 sec.

In a sample (4), an adhesion width was 10 mm; C was 0.014 $m^2$; D was 0.008 $m^2$; and D/C was 0.57. The sample (4) exhibited a leakage quantity of 0.52 mmHg and a required peeling time of 46 sec.

In a sample (5), an adhesion width was 8.3 mm; C was 0.014 $m^2$; D was 0.01 $m^2$; and D/C was 0.71. The sample (5) exhibited a leakage quantity of 0.82 mmHg and a required peeling time of 42 sec.

In a sample (6), an adhesion width was 6.3 mm; C was 0.014 $m^2$; D was 0.012 $m^2$; and D/C was 0.90. The sample (6) exhibited a leakage quantity of 3 mmHg and a required peeling time of 43 sec.

In a sample (7), an adhesion width was 6 mm; C was 0.014 $m^2$; D was 0.013 $m^2$ and D/C was 0.93. The sample (7) exhibited a leakage quantity of 3.4 mmHg and a required peeling time of 44 sec.

Upon study of the test results in reference to the graph illustrated in FIG. 5(C), the leakage quantity may be restrained to be 3 mmHg or less when D/C is 0.9. Furthermore, the required peeling time for the cover seal 7 may be restrained to be 90 sec. or shorter when D/C is about 0.42. Incidentally, the leakage quantity is accurate with few error while the required peeling time is not very accurate with large individual variations in the measurement, and therefore, D/C is regarded as 0.45 when the required peeling time for the cover seal 7 is 90 sec. or shorter. As a result, it is found that the relative ratio D/C of the total area C of the cover seal 7 to the total area D of the liner 731, which may achieve both of the leakage quantity and the required peeling time for the cover seal 7 in the magnetic disk drive intended by the present inventors, is about 0.45 or more and about 0.9 or less. In other words, when the relative ratio D/C is about 0.45 or more and about 0.9 or less, it is found that it is possible to satisfy the function of enhancing the reworkability of the cover seal 7 and the function of holding the air-tightness of the HDA 8.

As described above, the air-tightness of the HDA 8 may be secured by reducing the relative ratio D/C. However, the yield in the fabricating process becomes low caused by the degraded reworkability of the cover seal 7 if the relative ratio D/C is increased without any limit. In addition, if the air-tightness of the HDA 8 cannot be held by increasing the relative ratio D/C, dust may intrude into the magnetic disk drive, thereby causing a head crash by the dust intruding between the head and the magnetic disk. In view of this, it is necessary to determine a lower limit value of the relative ratio D/C in order to hold the air-tightness on the side of the liner of the cover seal 7. In contrast, an upper limit value of the relative ratio D/C depends upon the time required for peeling off the cover seal 7 during the rework.

Subsequently, in order to satisfy a leakage quantity of 3 mmHg or less and a required peeling time for the cover seal 7 of 90 sec. or shorter, the relationship between a length A (see FIG. 3) of the adhesive layer 72 adhering to the bonded surface 52 from an inside end 5a of the bonded surface 52 of the base 5 to an end 7b of the cover seal 7 nearest the end 5a and a length B (see FIG. 3) from an end 6d of the top cover 6 to an end 731a of the liner 731 nearest the end 6d was variously examined in a 3.5 type magnetic disk drive. Since air-tightness test and peeling test were identical to the tests which provided the above-described bases of the numerical limitations of C and D, only results of the air-tightness test and peeling test will be explained below.

Figure 6:
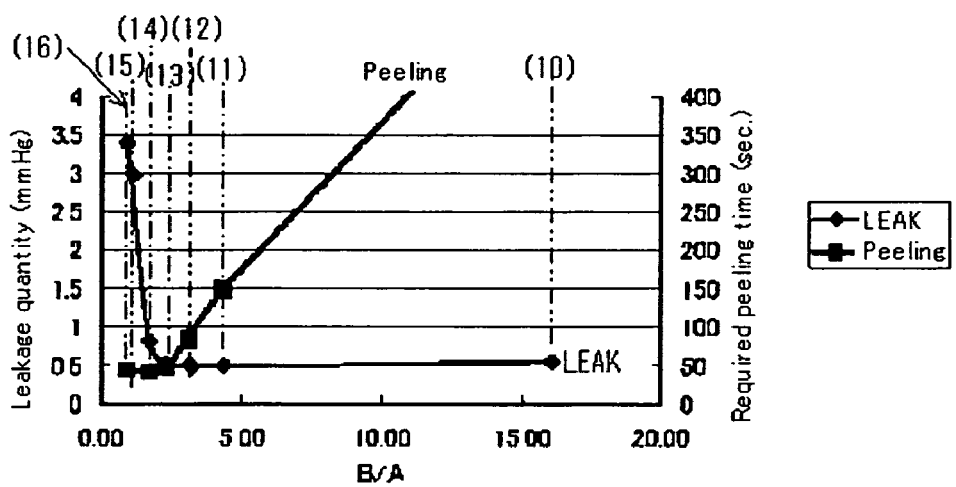
FIGS. 6(A) to 6(C) are a table and graphs illustrating other test results according to the present invention.
Figure 6:
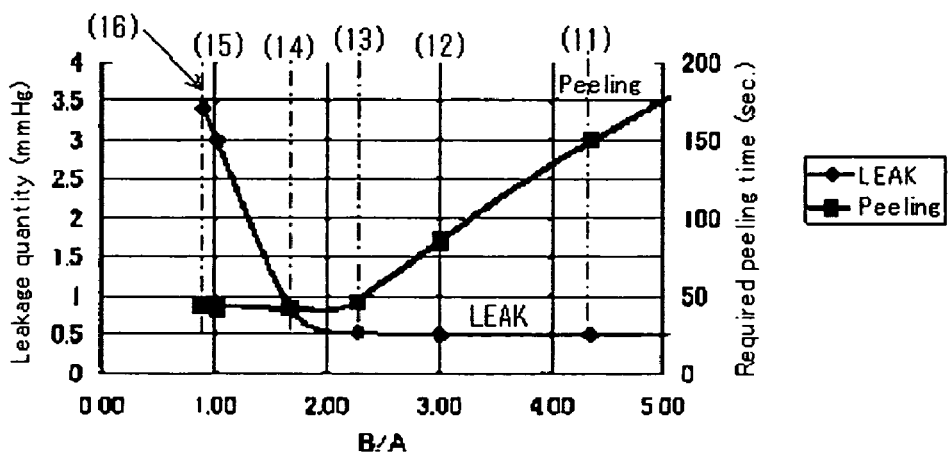

FIGS. 6(A) to 6(C) illustrate the results of the air-tightness test and the peeling-off test. FIGS. 6(A) to 6(C) are a table and graphs illustrating the test results, in which the relative ratio B/A of the length A (see FIG. 3) of the adhesive layer 72 adhering to the bonded surface 52 from the inside end 5a of the bonded surface 52 of the base 5 to the end 7b of the cover seal 7 nearest the end 5a and the length B (see FIG. 3) from the end 6d of the top cover 6 to the end 731a of the liner 731 nearest the end 6d was calculated in reference to A, and then, the relative ratio B/A was examined a plurality of times with respect to seven sample patterns. Here, FIG. 6(A) is a table illustrating the test results; FIG. 6(B) is a graph illustrating the relationship between the relative ratio B/A and the leakage quantity and the relationship between the relative ratio B/A and the required peeling time; and FIG. 6(C) is a graph obtained by partly enlarging the graph of FIG. 6(B).

In a sample (10), an adhesion width of the adhesive layer 72 adhering to the bonded surface 52 of the base 5 and the end 6d of the top cover 6 (hereinafter simply referred to as "an adhesion width") was 50 mm; A was 2.9 mm; B was 46.6 mm; and B/A was 16.07. The sample (10) exhibited a leakage quantity of 0.55 mmHg and a required peeling time of 600 sec.

In a sample (11), the adhesion width was 16 mm; A was 2.9 mm; B was 12.6 mm; and B/A was 4.34. The sample (11) exhibited a leakage quantity of 0.5 mmHg and a required peeling time of 150 sec.

In a sample (12), the adhesion width was 12.1 mm; A was 2.9 mm; B was 8.7 mm; and B/A was 3.00. The sample (12) exhibited a leakage quantity of 0.51 mmHg and a required peeling time of 85 sec.

In a sample (13), the adhesion width was 10 mm; A was 2.9 mm; B was 6.6 mm; and B/A was 2.28. The sample (13) exhibited a leakage quantity of 0.52 mmHg and a required peeling time of 46 sec.

In a sample (14), the adhesion width was 8.3 mm; A was 2.9 mm; B was 4.9 mm; and B/A was 1.69. The sample (14) exhibited a leakage quantity of 0.82 mmHg and a required peeling time of 42 sec.

In a sample (15), the adhesion width was 6.3 mm; A was 2.9 mm; B was 2.9 mm; and B/A was 1.00. The sample (15) exhibited a leakage quantity of 3 mmHg and a required peeling time of 43 sec.

In a sample (16), the adhesion width was 6 mm; A was 2.9 mm; B was 2.6 mm; and B/A was 0.90. The sample (16) exhibited a leakage quantity of 3.4 mmHg and a required peeling time of 44 sec.

In the samples (10) to (16), the adhesion width does not match with the sum of the adhesion lengths A and B. This is because there is a clearance t of 0.5 mm between the inside end 5a of the bonded surface 52 of the base 5 and the end 6d of the top cover 6. Since no adhesive layer 72 of the cover seal 7 adhesively covers the clearance t, the clearance t need not be taken into consideration with respect to the relationship between the lengths A and B.

Upon study of the test results, it is found that a leakage quantity of 3 mmHg or less may be achieved when the sum of the adhesion lengths A and B is 5.8 mm or longer, and further, that a required peeling time for the cover seal 7 of 90 sec. or shorter may be achieved when the sum is about 12 mm or shorter. As a consequence, if the adhesion length A is set to be 3.0 mm when the width of the bonded surface 52 of the base 5 is maximally 3.0 mm, the sum of the adhesion lengths A and B of 12 mm may be obtained by satisfying A×3. In view of this, it is found that the relationship between the adhesion length B of the adhesive layer 72 of the cover seal 7 adhering to the top cover 6 and the adhesion length A of the adhesive layer 72 of the cover seal 7 adhering to the bonded surface 52 of the base 5 should preferably range within $A \leq B \leq (A \times 3)$ in the 3.5 type magnetic disk drive. In other words, within $A \leq B \leq (A \times 3)$, it is found that it is possible to satisfy the function of enhancing the reworkability of the cover seal 7 and the function of holding the air-tightness of the HDA 8. Moreover, also in the graph illustrated in FIG. 6(C), B/A capable of achieving both of a leakage quantity of 3 mmHg or less and a required peeling time for the cover seal 7 of 90 sec. or shorter is about 3.1. Thus, it is found that the range of $A \leq B \leq (A \times 3)$ is excellent if digits to the right of the decimal point are discarded in consideration of a calculation error.

Alternatively, in the case where B is equal to A×2, if the adhesion length A is set to be 3.0 mm when the width of the bonded surface 52 of the base 5 is maximally 3.0 mm, the sum of the adhesion lengths A and B is 9 mm. From the table and graphs illustrated in FIGS. 6(A) to 6(C), it is found that the required peeling time for the cover seal 7 is about 45 sec. As a result, it is revealed that it is possible to simultaneously satisfy both of the function of enhancing the reworkability of the cover seal 7 and the function of holding the air-tightness of the HDA 8 in a high order.

Incidentally, a lower absolute value of the dimension of the length A depends upon the width of the bonded surface 52 of the base 5. That is to say, in the case of a 1 type magnetic disk drive, the width of the bonded surface 52 of the base 5 is 0.5 mm, and therefore, the bonding length of the cover seal 7 with respect to the bonded surface 52 merely ranges from 0.35 mm to 0.5 mm. However, in the case of the 1 type magnetic disk drive, the tolerance of the step defined at the bonded surface 52 of the base 5 and the surface 6a of the top cover 6 in order to prevent any leakage even in the size, a surface finishing accuracy of each of the surfaces, the strength of the adhesive agent and the like are enhanced in comparison with those in a 2.5 type (i.e., 2.5 inch (which is equal to about 6.35 cm) type) or a 3.5 type magnetic disk drive, thereby holding the air-tightness of the HDA 8. Consequently, it is desirable to adopt the cover seal 7 which is thinner than that in the 3.5 type magnetic disk drive. For example, it is preferable that the thickness of the aluminum layer 71a should be 7 μm, the thickness of the polyethylene terephthalate layer 71b should be 9 μm, the thickness of the adhesive layer 72 should be 20 μm, and the thickness of the liner 731 should be 9 μm. In this manner, the cover seal in the 1 type magnetic disk drive is made to be thinner than that in the 3.5 type magnetic disk drive since the cover seal may be used even in a magnetic disk drive of a small size.

The leakage quantity may be suppressed to be 3 mmHg or less when the sum of the adhesion lengths A and B is 5.8 mm or more. As a consequence, A>B may be satisfied by enhancing the adhesiveness of the adhesive layer 72 of the cover seal 7. However, the magnetic disk drive is not suitable for the air-tightness test in the fabricating process if the air-tightness is degraded on the side of the length B. Therefore, it is desirable that the length B should be independently set to such a value as to prevent the cover seal 7 from being peeled off even if the pressure is applied to the inside of the HDA 8.

Next, a description will be given of the fabricating process of the magnetic disk drive according to the present invention.

In a first block of the fabricating process of the magnetic disk drive, the head driving mechanism such as the spindle motor 2, the AHSA 3 and the FPC assembly 4 and the magnetic disk 1 are contained inside of the base 5. In a second block, there is prepared the cover seal 7 cut in conformity of the contour of the liner 731 in the peeling film 73 in advance. The contour of the liner 731 is cut in such a manner that the adhesive layer 72 of the cover seal 7 may be secured to the base 5 in a manner facing to the surface 6a of the top cover 6, in which the bonded surface 52 of the base 5 and the liner 731 are disposed. In a third block, the top cover 6 is fitted to the step 51 formed inside of the opening edge 53 of the base 5 containing therein the head driving mechanism and the magnetic disk 1, and then, is fixed to the base 5 via screws or the like. In a fourth block, the adhesive layer 72 is exposed by removing a peeling film 732 from the peeling film 73 of the cover seal 7 except for the liner 731. In a fifth block, the liner 731 is allowed to face to the surface 6a of the top cover 6, and further, the exposed adhesive layer 72 adheres to the bonded surface, whereby the cover seal 7 is secured to the base 5. At this time, the air-tightness of the HDA 8 is readily held since the exposed adhesive layer 72 at the cover seal 7 adheres to the bonded surface 52 of the base 5 and the surface 6a of the top cover 6 in the fifth block. Furthermore, the surface 6a of the top cover 6 is flat without any unevenness, so that the cover seal 7 may adhere to the surfaces without any crease. Additionally, the cover seal 7 adheres to the surfaces after the top cover 6 is fixed to the base 5 via the screw or the like, thereby obviating formation of numerous holes at the cover seal 7.

In consideration of the simultaneous satisfaction of both of the function of enhancing the reworkability of the cover seal 7 and the function of holding the air-tightness of the HDA 8, the exposed adhesive layer 72 in the fifth block is allowed to adhere to the bonded surface 52, and further, the relative ratio of the total area C of the cover seal 7 (see FIG. 2) to the total area D of the liner 731 (see FIG. 2) is adjusted to range from about 0.45 or more to about 0.9 or less in reference to the total area C.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
   a base provided with a bonded surface around an opening edge and containing therein a head driving mechanism and a magnetic disk;
   a top cover to be fitted to the opening edge so as to be fixed to the base;
   a cover seal including a sheet-like structure and an adhesive layer formed on the sheet-like structure and disposed at a surface of the top cover to be fitted to the opening edge and the bonded surface of the base, so as to be fixed to the base owing to adhesion of the adhesive layer to the surface of the top cover and the bonded surface of the base; and
   a liner interposed between the adhesive layer of the cover seal and the surface of the top cover.

2. A magnetic disk drive as claimed in claim 1, wherein the adhesive layer comprises an adhesive agent applied onto the structure.

3. A magnetic disk drive as claimed in claim 1, wherein the liner is a part of a peeling film bonded onto the adhesive layer.

4. A magnetic disk drive as claimed in claim 1, wherein the thickness of the liner is about 25 μm or less.

5. A magnetic disk drive as claimed in claim 1, wherein the sheet-like structure of the cover seal is formed of an aluminum layer.

6. A magnetic disk drive as claimed in claim 1, wherein the sheet-like structure of the cover seal is formed of an aluminum layer and a polyethylene terephthalate layer, and the adhesive layer is formed on the polyethylene terephthalate layer.

7. A magnetic disk drive as claimed in claim 1, wherein the sheet-like structure of the cover seal is formed by laminating a first polyethylene terephthalate layer, an aluminum layer and a second polyethylene terephthalate layer in order, and the adhesive layer is formed on the first polyethylene terephthalate layer.

8. A magnetic disk drive as claimed in claim 1, wherein the thickness of the cover seal including the sheet-like structure and the adhesive layer in combination is about 7 μm or more and about 75 μm or less.

9. A magnetic disk drive as claimed in claim 1, wherein the base is formed by pressing a metallic plate, and the bonded surface is formed by bending the opening edge.

10. A magnetic disk drive as claimed in claim 9, wherein the width of the bonded surface is about 0.5 mm or more and about 3.0 mm or less.

11. A magnetic disk drive as claimed in claim 9, wherein the bonded surface is flush with the surface of the top cover.

12. A magnetic disk drive as claimed in claim 9, wherein the adhesive layer of the cover seal adheres to the bonded surface in the length of about 70% or more of the width of the bonded surface.

13. A magnetic disk drive as claimed in claim 1, wherein the adhesive layer adheres to the bonded surface in a length A from an inside end of the bonded surface to an end of the cover seal nearest the inside end, and the relationship between a length B from an end of the top cover to an end of the liner nearest the end of the top cover and the length A is expressed by an inequality: $A \leq B \leq (A \times 3)$.

14. A magnetic disk drive as claimed in claim 13, wherein the relationship between the length B from the end of the top cover to the end of the liner nearest the end of the top cover and the length A is expressed by an inequality: $A \leq B \leq (A \times 2)$.

15. A magnetic disk drive as claimed in claim 1, wherein a relative ratio D/C of a total area C of the cover seal to a total area D of the liner is about 0.45 or more and about 0.9 or less.

* * * * *